United States Patent [19]
Elgert et al.

[11] Patent Number: 6,009,900
[45] Date of Patent: Jan. 4, 2000

[54] GAS FITTING

[75] Inventors: Uwe Elgert; Peter Elsner, both of Frankfurt, Germany

[73] Assignee: Messer Griesheim Schueisstechnik GmbH & Co., Germany

[21] Appl. No.: 09/211,169

[22] Filed: Dec. 14, 1998

[30] Foreign Application Priority Data

May 19, 1998 [DE] Germany .......................... 198 22 369

[51] Int. Cl.[7] .................................................. G05D 16/04
[52] U.S. Cl. .................... 137/557; 137/505; 137/505.28; 137/613; 251/250.5
[58] Field of Search .......................... 137/505.25, 505.28, 137/557, 613, 505; 251/250.5

[56] References Cited

U.S. PATENT DOCUMENTS

| | | | |
|---|---|---|---|
| 3,511,266 | 5/1970 | Phlipot | 137/505.25 |
| 3,511,273 | 5/1970 | Bartholomaus | 137/557 |
| 4,655,246 | 4/1987 | Phlipot | 137/505.25 |
| 5,809,780 | 9/1998 | De Jong | 251/250.5 |

*Primary Examiner*—Stephen M. Hepperle
*Attorney, Agent, or Firm*—Connolly Bove Lodge & Hutz LLP

[57] ABSTRACT

The gas fitting contains a supply-pressure shut-off element, a pressure regulator and a pressure gage for the pressure indication in a row, the supply-pressure shut-off element and the pressure regulator being arranged between the pressure gage and the compressed-gas source, and the pressure gage with the pressure indication being integrated in the operating element of the pressure regulator. The gas fitting is used for mounting on laboratory furniture.

19 Claims, 5 Drawing Sheets

GAS FITTING

BACKGROUND OF INVENTION

The invention relates to a gas fitting having a shut-off element (shut-off valve) for the supply pressure, a pressure regulator, and a pressure gage for the pressure indication.

Laboratory gas-tapping points have hitherto been constructed very non-uniformly. The most important construction units—the supply-pressure shut-off valve, tapping-point pressure regulator and back-pressure pressure gage—are arranged visibly next to one another as separate units. Such a gas-tapping point is described, for example, in DE 4223233 C1.

The known gas-tapping points have the following disadvantages:
  multiplicity of variants of laboratory gas-tapping points, due to various installation situations in the laboratory furniture: table fitting, energy lines, energy bridges, discharge fitting (long and narrow) and upright fitting
  complex appearance due to various operating levels and many corners and edges
  a multiplicity of sealing points and screwed connections between the individual components
  dimensions which are too large
  high cost for stockkeeping due to the multiplicity of parts
  expensive maintenance
  inadequate ergonomy, and
  excessive weight.

SUMMARY OF INVENTION

The object of the invention is to provide a gas fitting having a compact type of construction and without the abovementioned disadvantages.

Compressed-gas sources are, for example, compressed-gas reservoirs, compressed-gas cylinders, pressure capsules and in particular compressed-gas lines. The compressed-gas source delivers gases or gas mixtures, e.g. industrial gases or ultra-pure gases such as nitrogen, oxygen, hydrogen, synthetic air, inert gases (e.g. helium, argon, krypton, xenon), carbon dioxide, ammonia or gas mixtures, in particular test-gas mixtures.

The gas fitting contains a rotatable handle part, which serves as an operating element for a pressure regulator. The operating element is preferably a cylindrical part, which is hollow and open at both ends, or a cap. The operating element contains a pressure-measuring instrument (pressure gage) with pressure indication. The pressure gage preferably serves to measure and indicate the back pressure (reduced pressure downstream of the pressure regulator). In the preferred type of construction there is no mechanical connection between the operating element for the pressure regulator and the pressure gage. Consequently, during a rotation of the operating element for setting the back pressure at the pressure regulator, the pressure gage remains in an unaltered position. Pressure gages having a cylindrical form with a central gas intake (gas inlet) on the bottom side and a pressure indication on the top side (head side, operator side) are preferably used (can-shaped pressure gage). The gas inlet of the pressure gage is preferably connected via a push-in connection and firmly mounted (preferably secured via a locking screw, e.g. a setscrew). The window of the pressure indication is generally part of the pressure gage. The pressure indication is advantageously covered with an arched window. When a pointer instrument is used, a curved or three-dimensionally configured pointer is preferred. In addition, the use of a window arched outward (top side) and a pointer having a part projecting from the pointer plane permits good readability from the side. Instead of the window of the pressure indication being connected to the pressure gage, the window may also be part of the operating element. For example, the handle part serving as an operating element may form a cap with the window. The window is then not connected to the pressure gage and rotates with the handle part.

The window of the pressure indication is a transparent cover, e.g. a flat disk, an arched part such as a plastic shell or a solid plastic part which advantageously has a completely or partly arched form. The solid plastic part preferably acts like a lens, as a result of which the readability of the pressure indication (pressure scale) is improved.

The window of the pressure indication (transparent cover) is preferably made of a transparent plastic such as polystyrene, polypropylene, polycarbonate, cycloolefin copolymer (COC), acrylic glass or polymethylmethacrylate (PMMA). Especially suitable are polycarbonate, cycloolefin copolymer (COC), acrylic glass or polymethylmethacrylate (PMMA).

The handle part (operating element of the pressure regulator) is generally opaque and is made of plastic (e.g. polyproplyene, polyamide, ABS, polyester) or metal (e.g. brass, high-grade steel, aluminum). The handle part is preferably provided with gripping aids. Gripping aids are, for example, specially shaped surface forms such as recessed portions, hollows, grooves, knobs or webs. Gripping aids may also be additional parts or coatings of plastic, rubber, rubber-like material or an elastomer, in particular a thermoplastically workable elastomer, which are attached to the handle part, e.g. a coating, rings, a sleeve or a band, knobs, webs or pads.

The outer parts of the gas fitting, such as the handle part, shut-off ring and casing, are preferably made of plastic.

The gas fitting generally contains a basic body on which the shut-off element and the pressure regulator are arranged. The basic body of the gas fitting is made of a thermally moldable material such as metal or plastic. The basic body is preferably made of metal, in particular brass (preferably nickel-plated) or high-grade steel and preferably has a connection, e.g. threaded connection or bayonet connection, at one end (bottom end) for fastening to the compressed-gas source (as a rule the compressed-gas line). The basic body is preferably of cylindrical construction. The basic body contains gas passages, for example in the form of bores. In general, the inlet for the compressed gas (high-pressure side, supply pressure) and the connection for the compressed-gas source are located on the end face (bottom end) of the upright cylindrical body. A gas passage leads from the gas inlet to a shut-off element (preferably integrated at the side) and from the shut-off element to the pressure regulator (preferably in the head region of the basic body). From the pressure regulator, the gas brought to back pressure is directed to an outlet, which is preferably arranged laterally in the basic body.

The gas fitting combines the shut-off element, pressure regulator and pressure-indicating instrument (pressure gage) in the smallest space. The space is essentially a cylindrical space having a preferably cap-shaped end (on the head side). Contained in this cylindrical space is a basic body, which accommodates the shut-off element and the pressure regulator. The gas fitting therefore seems like one part to the viewer. In the cylindrical space, the shut-off element and the pressure regulator are arranged between the compressed-gas source and the pressure gage. In other words, the pressure gage, pressure regulator and shut-off element are arranged one behind the other (in a row), the parts generally being in alignment. That is to say, the cross section of the gas fitting is determined essentially by the cross-sectional area of the pressure gage or the handle part. The cross section (the width) of the gas fitting is generally not larger than the cross section (the width) of the handle part (operating element of the pressure regulator).

The cylindrical space (or the cylindrical body) is preferably rounded off at one end (top part, head). The handle part (operating element of the pressure regulator) and the window of the pressure indication are located at this end. The handle part is easier to manipulate, i.e. the ergonomy is improved, by the head being rounded off.

The connection between the gas path on the back-pressure side and the pressure gage is preferably made via a central opening or bore in a central part of the pressure regulator, for example by a diaphragm rod having a central bore in the case of a pressure regulator based on a diaphragm valve. The pressure gage is preferably fastened to the pressure regulator by a non-rotatable push-in connection having an O-ring seal. The position of the pressure gage is fixed, for example, by means of a locking screw (setscrew). The regulating pressure of the pressure regulator is set via the handle part (operating element).

The shut-off element is preferably a gas valve, e.g. a stuffing-box valve, a slide, a rotatable disk having a gas-transfer port, a ball valve or a diaphragm valve. The use of a diaphragm valve as the shut-off element is especially preferred, in particular in the case of applications with ultra-pure gases. The shut-off element advantageously closes with the supply pressure. If the supply pressure is increased, the closing pressure increases. This leads to increased safety.

The shut-off element is operated via an adjusting device. An adjusting device is, for example, a rotary ring, a slide ring, a wheel, a lever, a pushbutton, a press key, a switch, a slide switch or a rocker switch. The adjusting device is coupled directly or indirectly to the closing device (e.g. closing pin of a valve) of the shut-off element. The shut-off element is preferably operated via a rotary ring (shut-off ring), which is formed like a cylinder-jacket segment on the cylindrical outer surface of the gas fitting. The axis of rotation of the rotary ring therefore runs parallel to the longitudinal axis of the gas fitting. The rotary ring may project beyond the cylindrical surface of the gas fitting. On the outside, the rotary ring is preferably provided with a gripping aid, e.g. a peg-shaped piece (called a position vane). In the preferred embodiment of the gas fitting, apart from a lateral outlet for the connection of a gas-tapping line or a hose line, the position vane is the only part which projects laterally from the cylindrical body of the gas fitting. The position vane is preferably interchangeable. The position vane may be fastened to the shut-off ring, for example by means of a latching push-in connection. The position vane is preferably colored specifically in relation to the gas type. The gas-type-specific colored configuration of the interchangeable position vane on the shut-off ring permits a simple and flexible integrated gas-type identification.

Depending on the direction of rotation, a rotary movement of the shut-off ring is converted into an opening or closing movement of the shut-off element. To convert the rotary movement, different devices may be used, e.g. a gear drive (bevel gears; flat gears arranged at right angles to one another; worm/gear), friction drive (ring/wheel), lever transmission (ring/lever) or belt drive. In the case of a rotary valve, arranged laterally in the basic body, as the shut-off element, the axes of rotation of the shut-off ring and rotary valve are generally at right angles to one another.

The position of the shut-off element ("On" or "Off") is clearly and directly recognizable from the position vane/shut-off ring, in contrast to a handwheel. In addition, the setting position "On" or "Off" can be seen via an indicating window or a clearance in the casing of the gas fitting. The two setting positions are preferably preset by two latching positions and/or two stops. The drive transmission, which is generally integrated, leads to smooth-running operability of the shut-off element, which is more difficult to adjust per se on account of the applied supply pressure.

The gas fitting is advantageously connected to the compressed-gas source (generally a compressed-gas line having a threaded connection) via an intermediate piece (clamping socket) having a left-hand thread at one one and a right-hand thread at the other end, in which case corresponding, different threads are provided at the gas inlet of the gas fitting and at the gas outlet of the compressed-gas source. As a result, the mounting of the gas fitting is substantially simplified. The intermediate piece is put between the ends to be connected and tightened simultaneously at both ends. The original position of the gas fitting is retained. As a result, the gas fitting can be oriented without any problem. In an especially advantageous manner, the intermediate piece is adapted to the cross section of the gas fitting and provided with a gripping aid, e.g. gripping hollows or ribs. The clamping socket is generally made of metal or plastic and is sealed off at the connections via O-rings. An intermediate piece of plastic may advantageously be designed in such a way that it can be sealed off directly without additional seals.

The gas fitting is distinguished by a universal type of construction, which leads to a number of advantages.

Due to the use of an all-metal seal in the region of the direct gas contact and the construction of the basic body in high-grade steel or brass, in particular due to the use of diaphragm valves having a Hastelloy(®)diaphragm in the case of the pressure regulator and shut-off element, the gas fitting can be used for all the common ultra-pure gases (e.g. gases of purity 6.0). By simple exchange of the position vane, colored according to the gas type, and of the gas-type adhesive sticker, the gas fitting can be easily adapted to the gas type. This means that, for a given pressure-regulating range, only one standard type of the gas fitting is required, for example in each case a standard type for 1.5 bar, 4 bar and 10 bar maximum back pressure, in which case generally only different pressure regulators and pressure gages are fitted. The entire range of gas fittings for the most varied applications in the laboratory sector/laboratory-furniture sector (at least 15 different types) is thus covered.

The compact outer surface of the gas fitting permits simple cleaning. The handle part, serving as the operating element of the pressure regulator, provides effective dust protection and mechanical protection for the internal parts such as the pressure gage. The handle part acts as a protective cap for the pressure gage.

The gas fitting is preferably used in the laboratory sector, e.g. as a gas-tapping point in laboratory furniture. The gas fitting is optionally equipped with a metering valve arranged at the gas outlet of the gas fitting. Generally, the metering valve is connected to the gas fitting via a short gas line. When the gas fitting is mounted in a wall of laboratory furniture, the gas connection (supply pressure), gas outlet and gas-line section to the metering valve are located behind the laboratory wall. In a combination of the gas fitting with a metering valve, two mounting openings in the wall of the laboratory furniture are required, compared with at least three mounting openings previously in the case of conventional gas fittings.

The gas fitting generally has the following dimensions: diameter within the range of 35 to 80 mm, preferably 45 to 60 mm; length (without gas connection and clamping socket) within the range of 50 to 200 mm, preferably 100 to 150 mm. The clamping socket generally has an outside diameter like the gas fitting (40 to 80 mm) and a thickness normally of around 20 mm.

In the preferred embodiment, the gas fitting, that is the handle part and casing, has a diameter of 50 mm. In this case, the handle part has a length of 50 mm (without the window of the pressure indication), and the handle part and pressure-indication window result in a length of 60 mm. Here, the shut-off ring has a diameter of around 50 mm and a thickness of around 20 mm. In this case, the length of the gas fitting without the clamping socket and gas connection is about 113 mm.

THE DRAWINGS

DETAILED DESCRIPTION

Figure 1:
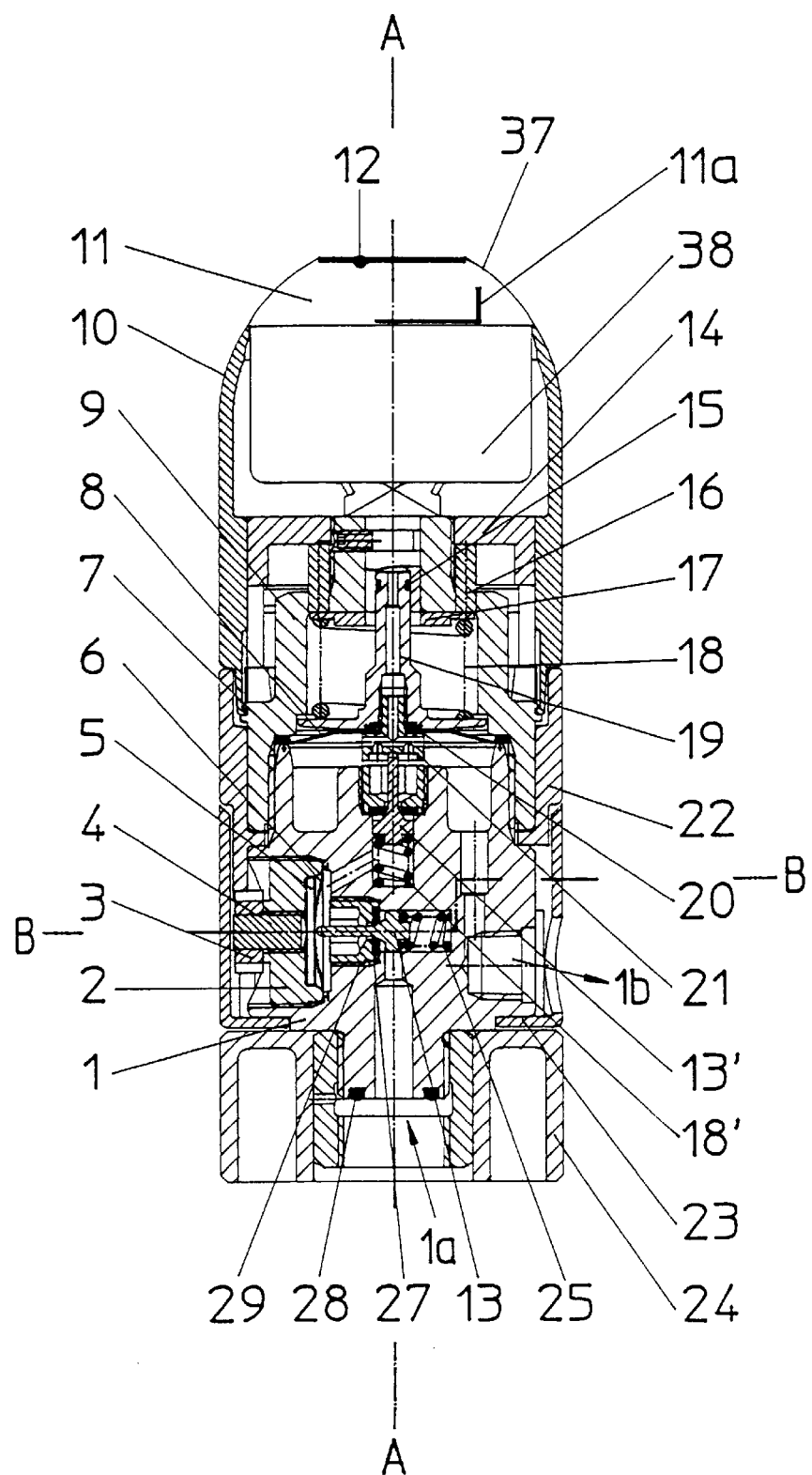
FIG. 1 shows the gas fitting in longitudinal section along the axis A—A.

FIG. 1 shows the gas fitting in longitudinal section. The basic body 1 (e.g. made of brass or high-grade steel) contains an incoming gas passage (inlet 1a) for compressed gas (e.g. 40 bar) from the compressed-gas source (compressed-gas line). The gas passage leads to the shut-off element, which preferably (as shown) consists of a diaphragm valve. The outer end of the pressure piece 4 of the diaphragm valve has twin flats (end with twin-faced profile). The gear 3 is put onto this twin-faced end of pressure piece 4 in a movable manner (movement perpendicular to the rotary movement of the gear). The pressure piece 4 has an external thread, which is moved in the internal thread of the retaining screw 2 during rotation of the gear 3. A rotary movement of the gear 3 produces a stroke movement of the pressure piece 4. Due to the free coupling of the gear 3 with the pressure piece 4 via the twin-faced profile (driver), the gear 3 does not follow the stroke movement of the pressure piece 4. The teeth on the bottom edge of the shut-off ring 22 mesh with the gear 3. Since the on/off function of the shut-off element is to be achieved by a quarter-circle rotation (rotation by 90°) of the shut-off ring 22, a tooth system over one quarter of the circle circumference of the bottom edge of the shut-off ring 22 (see FIG. 3) is sufficient. The transmission of the teeth of gear 3 and the teeth of the shut-off ring 22 is selected accordingly. A transmission of, for example, 4:1 (teeth of shut-off ring 22/teeth of gear 3) leads to easy operation of the shut-off element, which is tight per se. Unlike conventional shut-off elements having a diaphragm valve, the spring pressure and applied back pressure act in the same direction (closing direction), as a result of which greater safety is ensured. A gas passage leads from the shut-off element to the pressure-regulating stage. The pressure-regulating stage shown consists of a diaphragm pressure regulator with diaphragm rod 19, diaphragm 8, closing pin 13', top compression spring 18 and bottom compression spring 18'. The pressure-regulating stage is enclosed by basic body 1 and spring cap 9. At the top end, the spring cap 9 has an external thread, on which the regulating screw 14 sits. The regulating screw 14 has an external hexagon profile. In the bottom region, the handle part 10 has a recess formed as a hexagon socket. The hexagon socket of handle part 10 accommodates the external hexagon profile of regulating screw 14. When the handle part 10 is rotated, the regulating screw 14 moves on the thread of the spring cap 9, in the course of which two pressure pins 16 are moved up or down. In the process, the external hexagon profile of regulating screw 14 moves in the passage formed by the hexagon socket of the handle part 10.

The bottom margin of the handle part 10 is curved slightly inward. The margin of the handle part sits in a groove of the spring cap 9 (apparent in FIG. 1). The pressure pins 16 transmit the movement of the regulating screw 14 to the top spring stop 17. The compressive force of the spring 18 on the diaphragm rod 19 with a bottom spring stop is thus set. The diaphragm rod 19 continues downward via the diaphragm screw 21, which contains a gas passage, in the closing pin 13'. The closing pin 13' has a square end (square profile). The square profile moves in the round bore of the gas passage, in which round bore a compression spring 18' provides for a counterpressure. The gas leaves downstream of the pressure-regulating unit at a reduced pressure via a gas passage having a lateral outlet 1b on the basic body 1. As a further special feature, the gas fitting has, in the region of the handle part 10, a pressure gage 38, which is connected to the gas passage on the side of the reduced pressure (back pressure) via a central bore in the diaphragm rod 19 (diaphragm rod 19 is hollow) and a gas passage in the diaphragm screw 21. The pressure gage 38 is connected at its central gas inlet to the hollow diaphragm rod 19 via a push-in connection (fixing and securing by means of setscrew). The pressure gage 38 with pressure indication 11 and pointer 11a can be read off through a transparent, arched window 37. The pressure can be read off from the front and the side. The window 37 is fastened to the pressure gage 38. The gas fitting is connected to the pressure line (gas source) via the clamping socket 24 (preferably right-hand thread and left-hand thread).

When fitting in laboratory furniture, the gas fitting is preferably mounted in a wall of the laboratory furniture, so that the gas fitting is attached in the wall of the laboratory furniture in the region of the (bottom) casing 23, that is below the shut-off ring 22 and above the gas outlet 1b. The gas outlet then lies behind the wall of the laboratory furniture and free for the connection of a gas-tapping line. The gas-tapping line generally leads to a gas-tapping valve (metering valve), which is likewise fastened in the wall of the laboratory furniture and is operated from the front side, like the gas fitting. A gas line (e.g. pipe or hose line) leads from the gas-tapping valve to the consumer.

Figure 2:
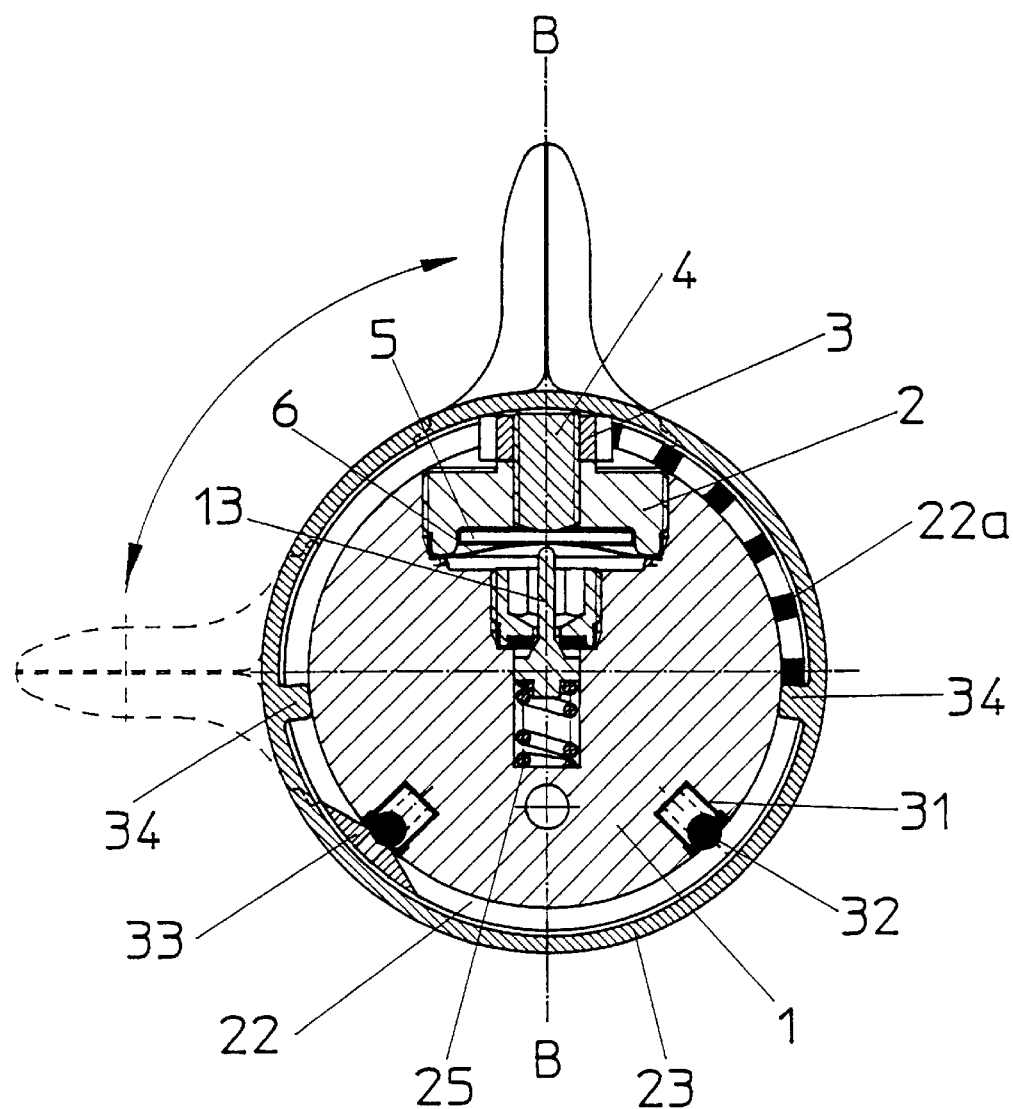
FIG. 2 shows a cross section of the gas fitting at the level of the shut-off element (along B—B)

FIG. 2 shows the gas fitting of FIG. 1 in cross section along line B—B. The shut-off element in the basic body 1 can be seen, consisting of a diaphragm valve containing the parts—compression spring 25, closing pin 13, diaphragm 6, sliding disk 5 and pressure piece 4 with gear 3, and the shut-off ring 22 with tooth system 22a on the bottom edge of the shut-off ring 22. The tooth system 22a extends over one quarter of the circumference of the shut-off ring 22 (extension of the shut-off ring 22 in the region of the tooth system 22a). The position vane 30 is attached to the shut-off ring 22, preferably via a push-in connection. The position vane 30 serves as a handle for actuating the shut-off element. The casing 23 is provided with two limiting ribs 34 at a distance of 180°, and these limiting ribs 34 are attached in the region of the tooth system 22a and form stops for the ends of the tooth system 22a (see FIG. 3). The position vane 30, drawn in broken lines, shows the closed position ("Off") after rotation of the position vane 30 with shut-off ring 22 by 90°.

The "On" and "Off" position of the shut-off ring 22 is set in a perceptible manner by means of a latching device. The latching device holds the shut-off ring in the set position. The latching piece 33 is designed as a peg-shaped extension of the bottom edge of the shut-off ring 22. The latching piece 33 contains a latching opening for the ball pressure piece 32. The ball pressure piece 32 with a compression spring is located in the location opening 31 in the basic body 1.

By rotation of the shut-off ring 22, the rotary movement is converted into a stroke movement via the tooth system 22a, meshing with the gear 3, on that edge (the bottom edge) of the shut-off ring 22 which faces the gear 3. The ratio (transmission) of the number of teeth of gear 3 and tooth system 22a is selected in such a way that the rotation of the shut-off ring 22 by 90° for a stroke movement of the pressure piece 4, which stroke movement is transmitted to the closing pin 13, is sufficient for opening and closing the shut-off element. In the shut-off element shown, which is a diaphragm valve, the gas pressure and the spring pressure of the spring 25 act in the same direction, that is in the closing direction of the closing cone of closing pin 13. This uncommon orientation of gas pressure and spring pressure (opposed pressure directions are normal) provides for additional safety at the shut-off element.

Figure 3:
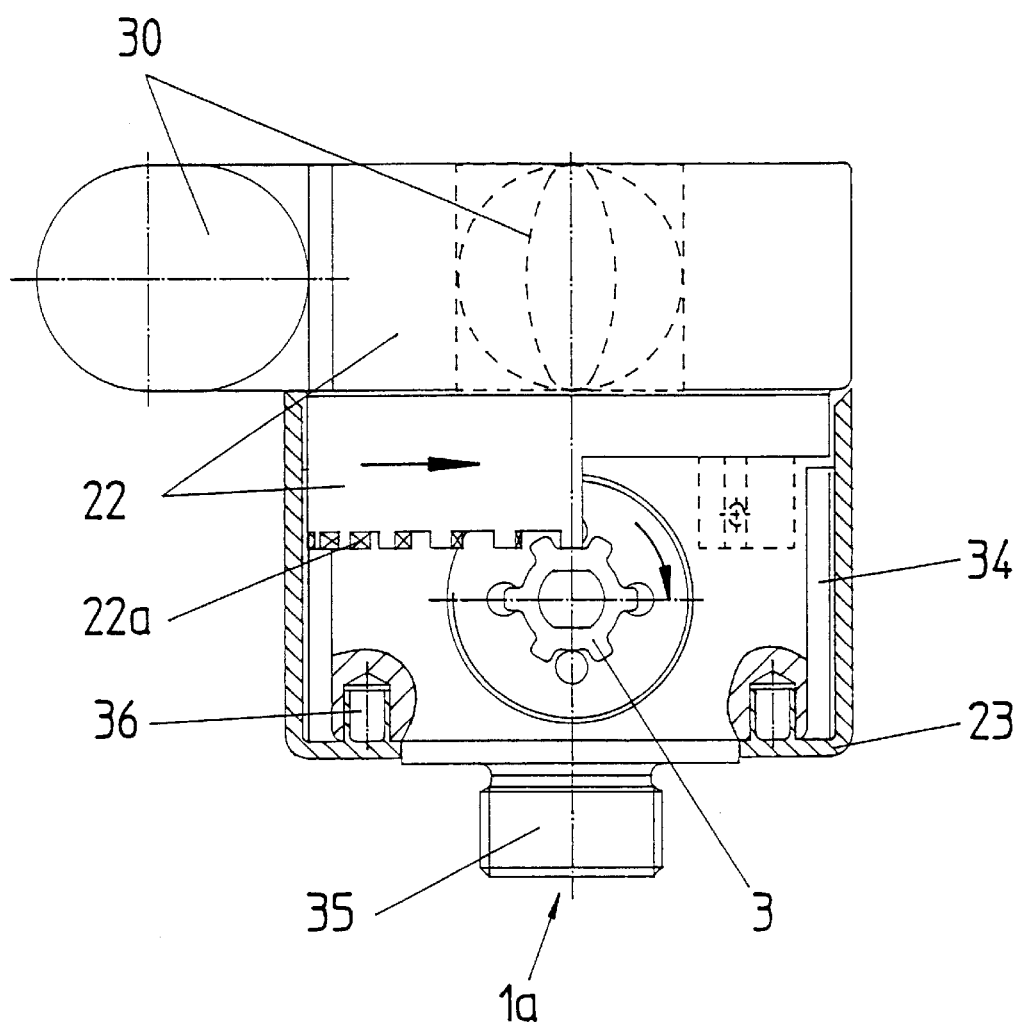
FIG. 3 shows a part (bottom part) of the gas fitting with a view of the adjusting device of the shut-off element.

FIG. 3 shows the bottom part of the gas fitting. The interaction between shut-off valve 22 and tooth system 22a and gear 3 is shown. The tooth system 22a, restricted to a quarter circle, and the extension on the shut-off ring 22 can be seen. The two limiting ribs 34 serve as a stop for the two end edges of the shut-off-ring section having the tooth system 22a. By the interaction between tooth system 22a and gear 3, a rotation about the longitudinal axis of the gas fitting is converted into a rotation about an axis perpendicular to the longitudinal axis. Since the pressure piece 4 is guided with its external thread in the internal thread of the retaining screw 2, a rotation produces an up or down movement (depending on the direction of rotation) of the pressure piece 4 and thus of the closing pin 13. The fastening nipple 36 serves to fasten the casing to the basic body 1. The compressed-gas line is connected via the connection piece 35.

For assembly, the retaining screw 2 has recessed portions arranged at 90° spacing on the top side (circles shown in FIG. 3 without numbering).

Figure 4:
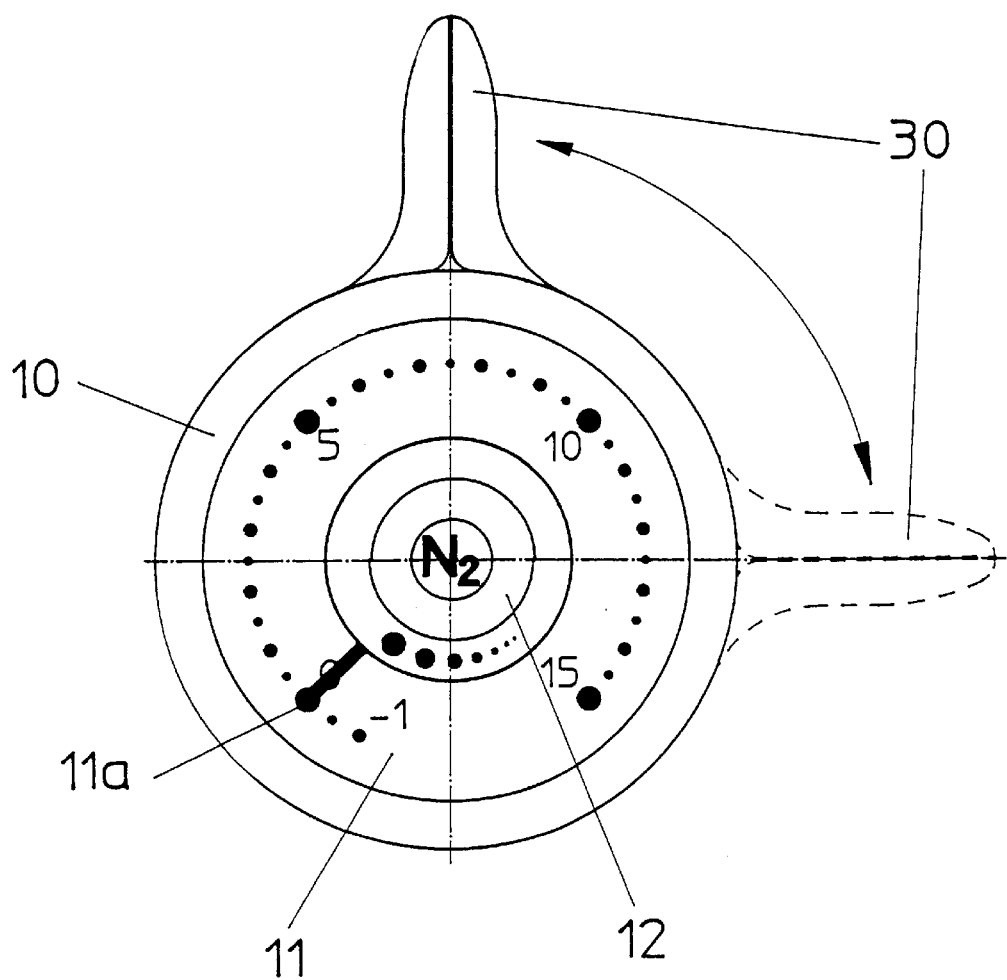
FIG. 4 shows a plan view of the gas fitting.

FIG. 4 shows the gas fitting in plan view (from above; from the operator side). The pressure regulator is operated by means of handle part 10. The pressure gage 38 with pressure indication 11 (pressure scale and pressure pointer 11a) and a transparent, preferably arched, plastic cover 37 (window) is integrated in the handle part 10, the handle part 10 and the pressure-measuring and pressure-indicating unit with pressure gage 38 being mechanically separate. The window 37 is preferably flat in the center region. The flat region of the window bears the gas-type adhesive label 12.

Figure 5:
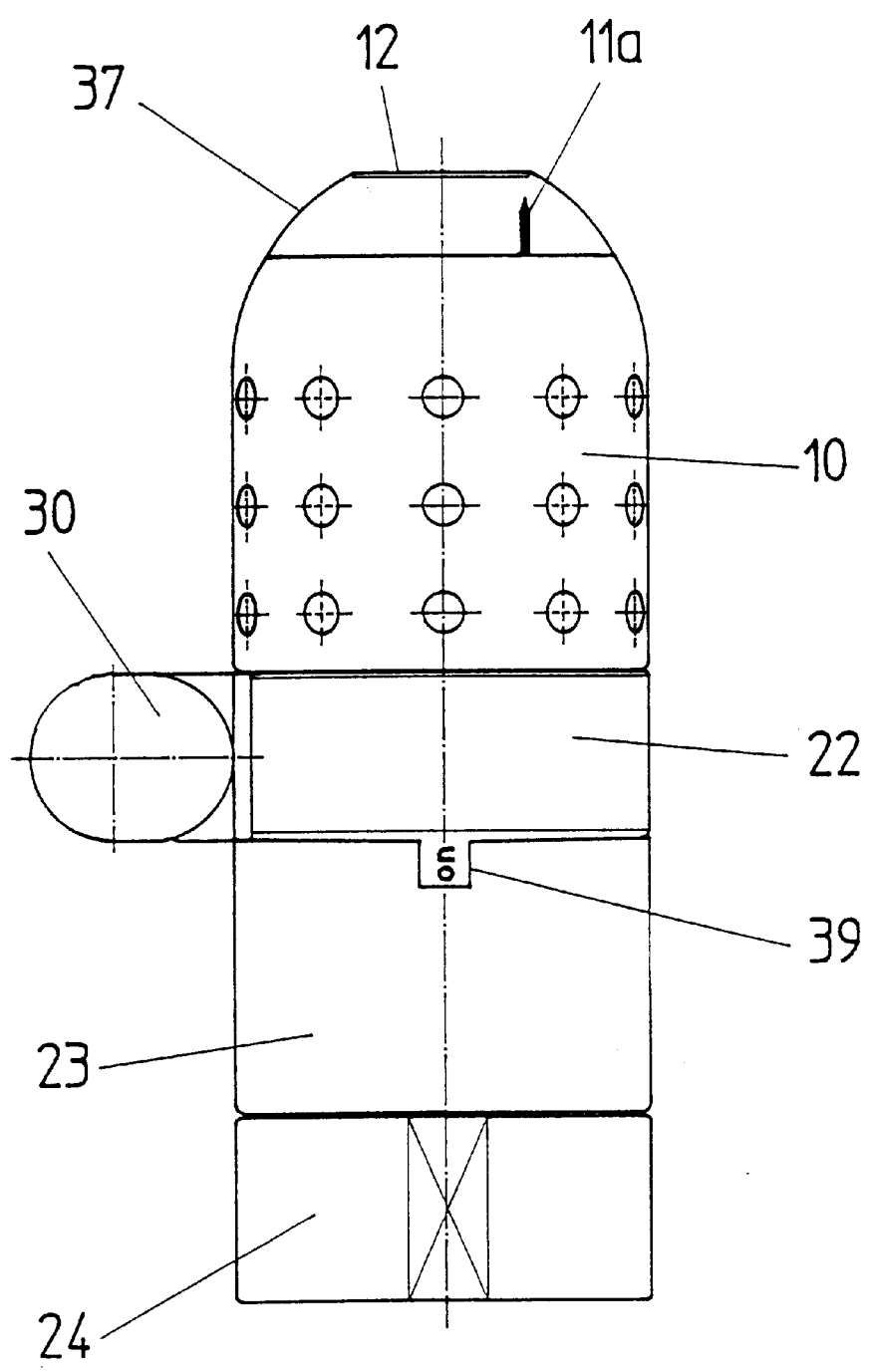
FIG. 5 shows a side view of the gas fitting.

FIG. 5 shows the gas fitting in side view. The casing 23 contains an aperture or a clearance 39 as a sight window for the position indication (opening state On/Off) of the shut-off element. Depending on the position of the shut-off ring 22, the sight window 39 shows one of two position marks ("On" or "Off") made at 90° spacing on the shut-off ring 22. The position vane 30 is attached to the shut-off ring 22. The position vane 30 is preferably attached to the shut-off ring 22 by clipping into place. The position vane 30 advantageously has the color typical of the gas type. The gas fitting can be used universally (that is for the different gases). By an interchangeable position vane 30 and gas-type adhesive label 12, the gas fitting can be adapted very easily to the gas type to be used.

What is claimed is:

1. A gas fitting having a supply-pressure shut-off element and a pressure regulator and a pressure gage for the pressure indication, wherein the supply-pressure shut-off element and the pressure regulator are arranged in a row between the pressure gage and the compressed-gas source, and the pressure gage with the pressure indication is arranged inside an operating element for the pressure regulator.

2. The gas fitting as claimed in claim 1, wherein the operating element has a cavity for accommodating the pressure gage.

3. The gas fitting as claimed in claim 1, wherein the shut-off element is actuated via a shut-off ring.

4. The gas fitting as claimed in claim 3, wherein the shut-off ring is actuated by rotation or sliding.

5. The gas fitting as claimed in claim 3, wherein the shut-off ring is actuated by rotation, and the shut-off element is connected to the shut-off ring by means of a transmission.

6. The gas fitting as claimed in claim 5, wherein the transmission is formed by a tooth system on the shut-off ring and a gear of the shut-off element.

7. The gas fitting as claimed in claim 6, wherein the shut-off element is a valve having a compression spring and a closing pin having a closing cone, and the gas pressure and the compression spring act in one direction and exert a pressure on the closing cone.

8. The gas fitting as claimed in claim 7, wherein the pressure gage is connected to the supply-pressure side via a hollow part, which is part of the pressure regulator.

9. The gas fitting as claimed in claim 2, where the shut-off element is actuated via a shut-off ring.

10. The gas fitting as claimed in claim 1, wherein the shut-off element is a valve having a compression spring and a closing pin having a closing cone, and the gas pressure and the compression spring act in one direction and exert a pressure on the closing cone.

11. The gas fitting as claimed in claim 1, wherein the pressure gage is connected to the supply-pressure side via a hollow part, which is part of the pressure regulator.

12. The gas fitting as claimed in claim 1 in combination therewith, a laboratory sector, and said gas fitting being incorporated in said laboratory sector.

13. The gas fitting as claimed in claim 12, wherein the gas fitting is combined with a gas-metering valve.

14. The gas fitting as claimed in claim 1, in combination therewith, laboratory furniture, and said gas fitting being incorporated in said laboratory furniture.

15. The gas fitting as claimed in claim 14, wherein the gas fitting is combined with a gas-metering valve.

16. The gas fitting as claimed in claim 8, in combination therewith, a laboratory sector, and said gas fitting being incorporated in said laboratory sector.

17. The gas fitting as claimed in claim 16, wherein the gas fitting is combined with a gas-metering valve.

18. The gas fitting as claimed in claim 8, in combination therewith, laboratory furniture, and said gas fitting being incorporated in said laboratory furniture.

19. The gas fitting as claimed in claim 18, wherein the gas fitting is combined with a gas-metering valve.

* * * * *